(12) United States Patent
Hanna et al.

(10) Patent No.: US 7,183,359 B2
(45) Date of Patent: Feb. 27, 2007

(54) POLYPROPYLENE HAVING A HIGH MALEIC ANHYDRIDE CONTENT

(75) Inventors: Paul K. Hanna, Sugar Land, TX (US); David D. Truong, Stafford, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 11/249,070

(22) Filed: Oct. 12, 2005

(65) Prior Publication Data

US 2006/0084764 A1    Apr. 20, 2006

Related U.S. Application Data

(60) Provisional application No. 60/619,279, filed on Oct. 15, 2004.

(51) Int. Cl.
*C08F 269/00*    (2006.01)
*C08L 23/12*    (2006.01)

(52) U.S. Cl. .................. 525/285; 525/286; 525/240

(58) Field of Classification Search ............... 525/285, 525/286, 240
See application file for complete search history.

(56) References Cited

U.S. PATENT DOCUMENTS

| | | | |
|---|---|---|---|
| 3,966,672 A | | 6/1976 | Gaylord |
| 4,315,863 A | * | 2/1982 | Tomoshige et al. ......... 549/233 |
| 4,708,918 A | | 11/1987 | Fitzgerald et al. |
| 4,857,600 A | * | 8/1989 | Gross et al. ................ 525/285 |
| 5,230,963 A | | 7/1993 | Knoerzer |
| 5,366,647 A | * | 11/1994 | Gutierrez et al. ........... 508/468 |
| 5,677,377 A | | 10/1997 | Hasegawa et al. |
| 5,677,378 A | | 10/1997 | Hasegawa et al. |
| 6,153,701 A | | 11/2000 | Potnis et al. |
| 6,228,948 B1 | | 5/2001 | Flaris et al. |
| 6,437,049 B1 | | 8/2002 | Bortolon et al. |

OTHER PUBLICATIONS

B. C. Trivedi, et al., Maleic Anhydride, 1982, Plenum Press, New York.
D. Suwanda, et al., "Reactive Extrusion of Polypropylene II: Degradation Kinetic Modeling", J. of Applied Polymer Science, 1988, pp. 1033-48, vol. 35.
C. Tzoganakis, et al., "Controlled Degradation of Polypropylene", Chemical Engineering Progress, Nov. 1988, pp. 47-49.
T. R. Felthouse, et al., "Maleic Anhydride, Maleic Acid, and Fumaric Acid," Kirk Online, Apr. 26, 2001, pp. 1-58.

* cited by examiner

*Primary Examiner*—James J. Seidleck
*Assistant Examiner*—Olga Asinovsky
(74) *Attorney, Agent, or Firm*—Madan, Mossman & Sriram PC

(57) ABSTRACT

Polypropylene having high maleic anhydride content, between about 5 and about 45 wt %, may be prepared by first reacting a metallocene-prepared polypropylene having terminal unsaturation with one mole equivalent of maleic anhydride to give polypropylene having a single unsaturation and a terminal succinic anhydride moiety. This product is then reacted with additional maleic anhydride in the presence of a free radical initiator (such as a peroxide or UV radiation) to give a polypropylene with maleic anhydride moieties along the backbone. The polypropylene product does not suffer scission or crosslinking with subsequently undesirable increases in molecular weight or viscosity. The maleic anhydride moieties provide reactivity to the polypropylene and thus expand its uses and applications.

14 Claims, No Drawings

POLYPROPYLENE HAVING A HIGH MALEIC ANHYDRIDE CONTENT

CROSS-REFERENCE TO RELATED APPLICATION

This application claims the benefit of U.S. provisional application No. 60/619,279 filed Oct. 15, 2004.

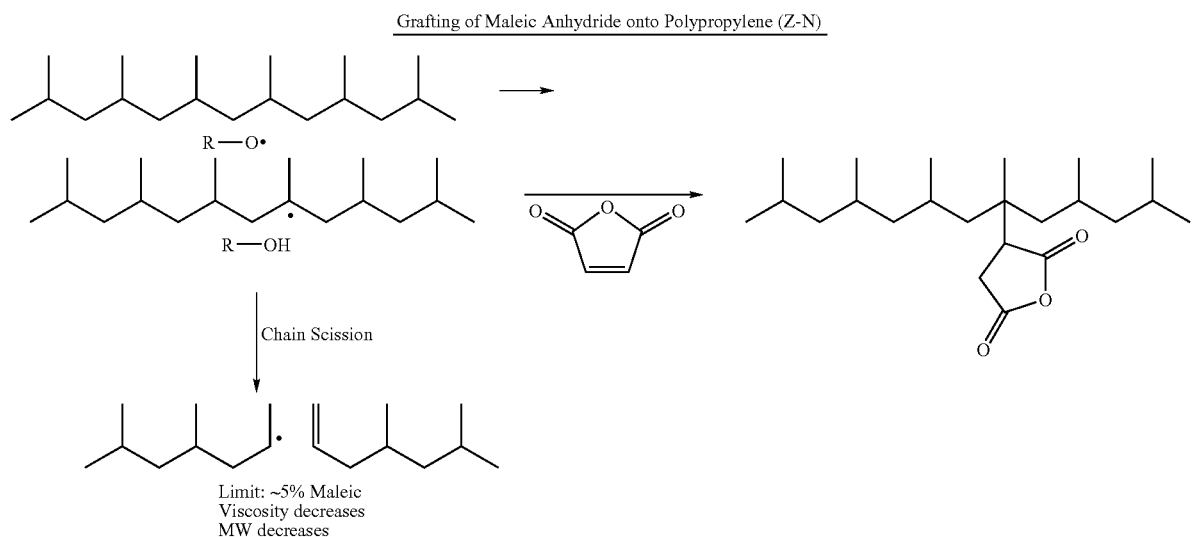

Grafting of Maleic Anhydride onto Polypropylene (Z-N)

Limit: ~5% Maleic
Viscosity decreases
MW decreases

FIELD OF THE INVENTION

The invention relates to methods for adding substituents to polypropylene, and most particularly relates, in one non-limiting embodiment, to adding relatively high amounts of maleic anhydride to polypropylene.

BACKGROUND OF THE ART

Polypropylene is a very large volume product (8,013,000 metric tons in the U.S. in 2003). One of the major problems with its use is that there are no polar functional groups in the polymer to provide reactive sites. Such sites would be useful to allow adhesion, compatibility, paintability, crosslinking, etc. A typical way to solve this problem is to add in a small amount of material which contains polar groups attached to a low molecular weight polypropylene backbone. The polypropylene backbone bonds to the bulk polypropylene and the polar groups allow reactivity with external materials. The most common polar group that is incorporated is maleic anhydride. Typical of this approach is Eastman® E43, Eastman® AP550, or Arkema Orevac® grafted polypropylenes. A major problem with these materials is that they contain relatively low amounts of functional groups. The amount of maleic anhydride is determined by its acid number or SAP number. This is defined as the number of milligrams of KOH required to neutralize 1 g of the polymer. The polymers mentioned above have acid numbers of about 40–45. This corresponds to approximately 4 wt % of the material being from maleic anhydride.

It is difficult to increase the amount of maleic anhydride. The maleic anhydride is typically attached by grafting initiated by a radical chain process. It has been found that polypropylene undergoes chain scission via radical processes (note C. Tzoganakis, et al., "Controlled Degradation of Polypropylene", *Chem. Eng. Prog.* 1988B, November, page 47, et seq. and D. Suwanda, et al., "Reactive Extrusion of Polypropylene II: Degradation Kinetic Modeling", *J. Appl. Polym. Sci.* 1988b, 35, page 1033, et seq.) This is shown in the schematic sequence below:

The chain scission results in significant loss of physical properties due to decreases in the molecular weight of the polypropylene and consequent decreases in viscosity.

It is also known (see: B. C. Trivedi, et al. *Maleic Anhydride*, Plenum Press 1982 and "Maleic Anhydride, Maleic Acid, and Fumaric Acid" in Kirk-Othmer) that olefins will form alternating polymers with maleic anhydride in the presence of radicals. This has been shown to happen for polypropylenes prepared via metallocene catalysts. This happens because metallocene catalysts produce polypropylenes that have a single vinylidene group on the end of each molecule. Such polymerization is schematically shown below:

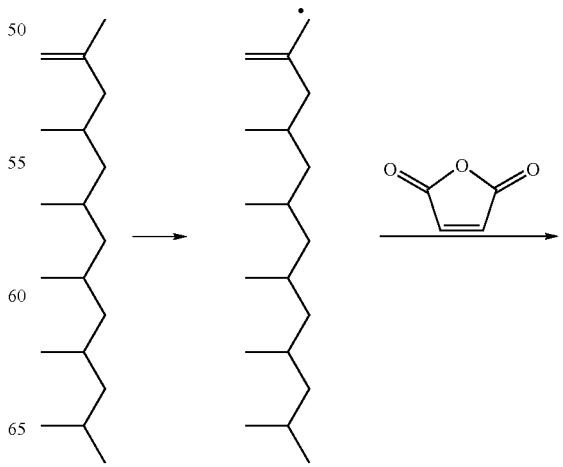

-continued

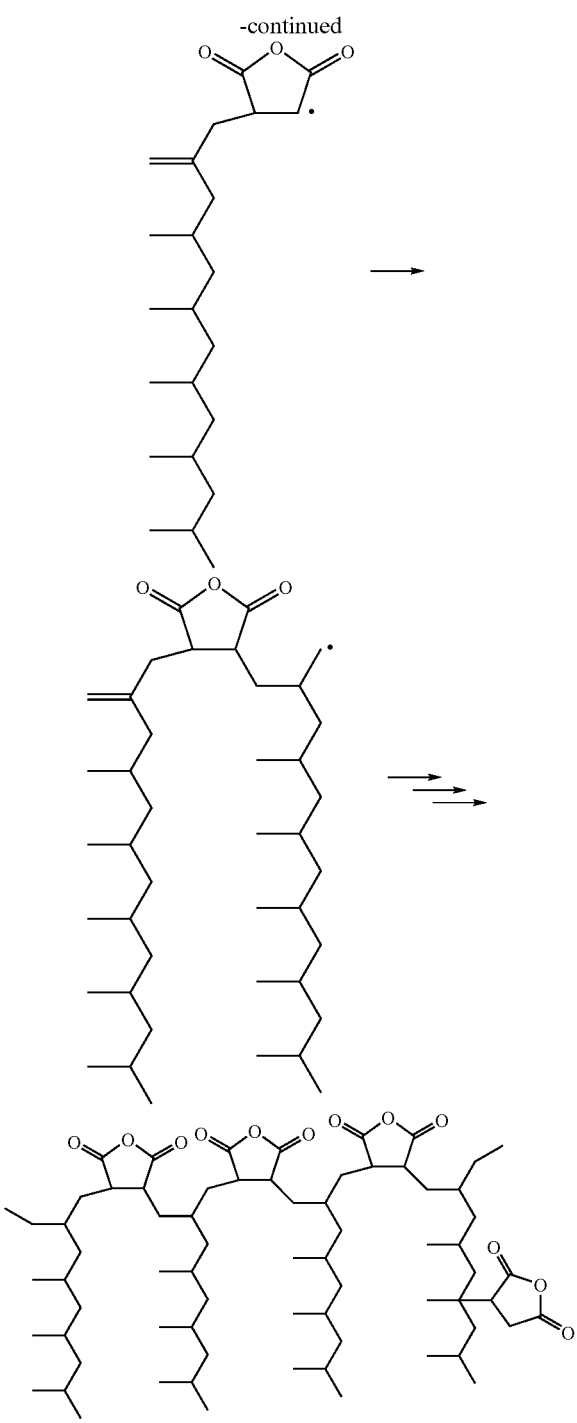

As can be seen from the end result shown above where polypropylene chains are joined by succinic anhydride moieties, the molecular weight greatly increases as does the viscosity of the material.

As noted, the incorporation of polar groups, such as maleic anhydride, into polymer can impart desirable properties to such polymers, e.g. having improved compatibility with polar compositions. For Example, U.S. Pat. No. 6,437, 049 to Bortolon, et al., discloses a modified polypropylene prepared by means of a grafting reaction with maleic anhydride that can be advantageously used as a compatibilizing agent in the preparation of polypropylene reinforced with glass fibers or mixed with polyamide. In Bortolon, the polypropylene is reacted with maleic anhydride in the presence of dilauryl peroxide that functions as free radical initiator. This reaction is not problem-free as in an example where 10 percent by weight of maleic anhydride is reacted with a polypropylene, the resultant polypropylene included less than 4 percent by weight of succinic acid moieties.

U.S. Pat. No. 6,153,701 to Potnis, et al, discloses preparing a wettable polypropylene composition comprising polypropylene modified with maleic anhydride, and lists a number of documents that include maleic anhydride modified polypropylene.

There remains a need for polypropylene having increased succinic anhydride content and a method for producing such material.

SUMMARY OF THE INVENTION

An object of the invention is to provide polypropylene that has increased amounts of succinic anhydride incorporated therein.

Another object of the invention is to provide a method of incorporating relatively large amounts of maleic anhydride into polypropylene that does not highly increase or decrease the molecular weight and viscosity of the resulting material.

In carrying out these and other objects of the invention, there is provided, in one non-restrictive form, a composition of matter including polypropylene having a single unsaturation, a terminal succinic anhydride moiety, and additional succinic anhydride substitutions on the polypropylene backbone.

In another non-limiting embodiment there is provided a process for making polypropylene substituted with maleic anhydride that involves reacting polypropylene having a terminal unsaturation with maleic anhydride in a mole ratio of about 1:1 to give polypropylene having a terminal succinic anhydride moiety and a single unsaturation. Then, the polypropylene having a terminal succinic anhydride moiety and a single unsaturation is reacted with additional maleic anhydride in the presence of free radical initiation to give the polypropylene product with increased succinic anhydride content.

DESCRIPTION OF THE PREFERRED EMBODIMENTS

A technique has been surprisingly discovered which allows the production of polypropylene with high amounts of succinic anhydride attached which does not materially affect the physical properties of the base polymer. Unexpectedly, there is no significant amount of either chain scission (undesirably forming a lower molecular weight polymer) or polymerization (undesirably forming an alternating copolymer). It is further unusual that this technique appears to be limited to polypropylene. It will be appreciated, however, that when the term "polypropylene" is used herein, it is intended to cover polymers and copolymers of polypropylene. It is common for small quantities of comonomers to be used with propylene monomer to control the melting point, and/or other properties. For instance, other comonomers used include, but are not necessarily limited to, ethylene, hexene, octene, and the like.

A key to this method is the use of succinic terminated polypropylene formed via the ene reaction onto vinylidene terminated polypropylene. This polypropylene is often, but not exclusively, prepared by metallocene catalysis. It has been discovered that grafting maleic anhydride onto this polymer does not result in significant chain scission or polymerization. In one non-limiting embodiment the method involves heating maleic anhydride in the presence of a polypropylene that has been formed using a metallocene catalyst in such a way that a single terminal vinylidene group results on each molecule. Most commonly these metallocene polymerizations are done in the presence of hydrogen (which speeds up the polymerization and lowers the molecular weight of the polymer) which results in polymer not having the terminal vinylidene group. These saturated polymers will not work in the inventive method, and thus the polymerization of propylene in the presence of a metallocene catalyst is preferably carried out in the presence of very little or no hydrogen or other transfer agents, such as triethylsilane, and the like.

The ene reaction is shown schematically below:

One would expect that attempts to graft more maleic anhydride onto these polymers would result in polymerization through the double bond. This would result in an alternating copolymer similar to the one discussed above. However, it has been surprisingly discovered in this process that the double bonds are essentially unaffected by the grafting process. All of the maleic anhydride adds to the backbone of the polypropylene—there is little/no polymerization or chain scission. This is shown schematically below:

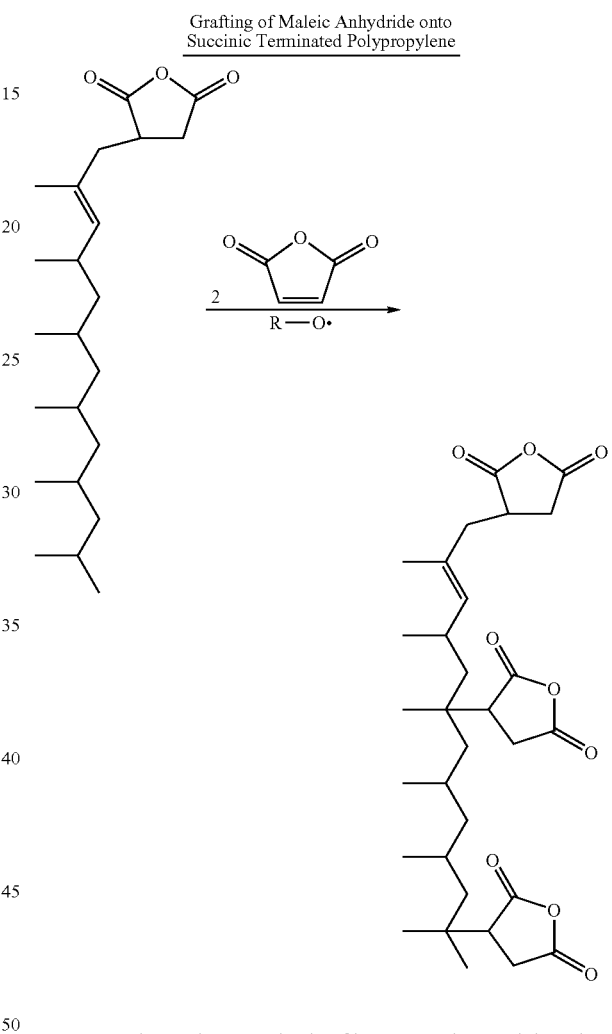

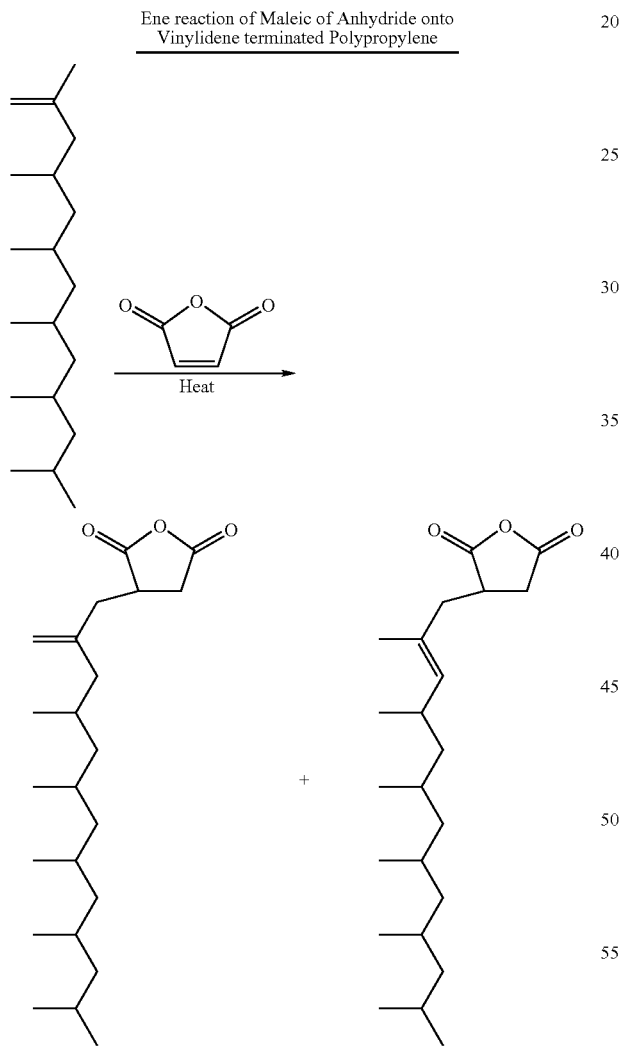

It is believed that the inventive technique may be applied to all forms of polypropylene, e.g., syndiotactic, hemisyndiotactic, isotactic, hemiisotactic, and atactic polypropylene, and that the polypropylene may be made by a wide variety of transition metal catalysts, although it will be appreciated that an exhaustive study of polypropylene made by all possible transition metal catalysts has not been conducted.

As noted, previous methods of incorporating maleic anhydride into polypropylene did not reach 5 wt % incorporation. While levels of incorporation below 5 wt % are certainly possible with the inventive technique, it is expected the method will find more utility achieving higher levels of total incorporation, on the order of about 5 to about 45 wt %, alternatively from about 10 to about 45 wt %. It has been found that attempting to incorporate maleic anhydride at levels above 45 wt % tends to produce an undesirably colored material. In one non-limiting theory this may be due to the production of polymaleic anhydride.

In one non-limiting embodiment of the invention, in the ene reaction, one molar equivalent of polypropylene (having a terminal unsaturation) is reacted with about one molar equivalent of maleic anhydride. Heating is applied, but this is generally simply enough necessary to make the polypropylene molten so that the reactants may be mixed. In one non-limiting embodiment of the method, heating is conducted at a temperature of about 200° C. for from about 12 to about 24 hours. Heating and mixing times could be longer, and heating temperatures could be as high as 240° C. This reaction may also be performed through the use of catalysts to lower the time and temperature requirements.

In another non-restrictive embodiment of the invention, in the further addition of maleic anhydride, the polypropylene having a terminal succinic anhydride moiety and a single unsaturation from the ene reaction is combined with additional maleic anhydride in the presence of free radical initiation. The free radical initiation may be any of the commonly used forms of free radical initiation including, but not necessarily limited to, peroxides, photoinitiation through ultraviolet radiation, gamma radiation, metal complexes and combinations thereof. In one non-limiting embodiment of the invention, the peroxide initiator is di-t-butyl peroxide.

When the further addition of maleic anhydride is performed neat, as in the Examples herein, it is necessary to heat the mixture to at least a molten state to permit mixing of the reactants. The reaction temperature will depend on the radical source and polymer melting point and may range from about 60° C. to about 200° C. Both steps of the process may be conducted at ambient pressure. Since maleic anhydride is volatile at higher temperatures, the reaction may be conducted in a sealed vessel.

In another non-restrictive form of the invention, the polypropylene having a terminal succinic anhydride moiety and a single unsaturation may be dissolved in a solvent and the heating during mixing may be reduced or eliminated. Suitable solvents for this polypropylene reactant include, but are not necessarily limited to, toluene, xylenes and mixtures thereof.

The Mn molecular weight of the product polypropylene substituted with maleic anhydride may range from about 500 up about 150,000 daltons, alternatively up to about 50,000 daltons, in another non-limiting embodiment up to about 10,000 daltons, and in another non-restrictive embodiment from 600 to about 5000 Daltons. The number average molecular weight Mn is determined by gel permeation chromatography (GPC) against a polypropylene standard or by NMR analysis.

The same sequence was attempted on ethylene-based materials. 1-Octadecene was chosen as an experiment. The ene reaction successfully performed on it with maleic anhydride as schematically illustrated below, where R is $C_9H_{19}$:

Ene reaction of Maleic Anhydride onto 1-Octadecene

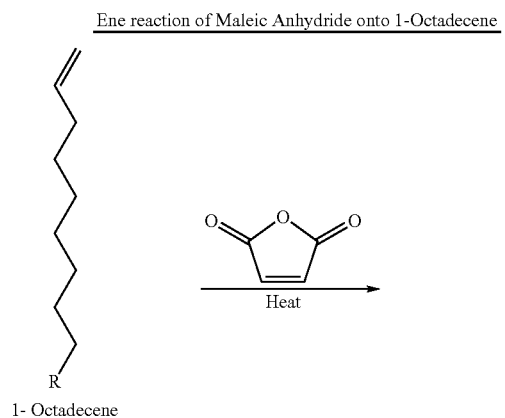

1-Octadecene

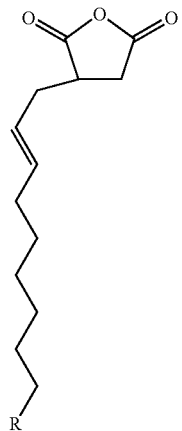

Next, it was attempted to graft more maleic anhydride onto the chain. The viscosity of the reaction mixture increased significantly. A $^{13}C$ NMR analysis of the product revealed that the olefinic carbons were largely eliminated. GPC analysis indicated formation of a new peak at significantly higher molecular weight than that of the starting material. These facts indicate that polymerization had taken place. A likely product is shown below:

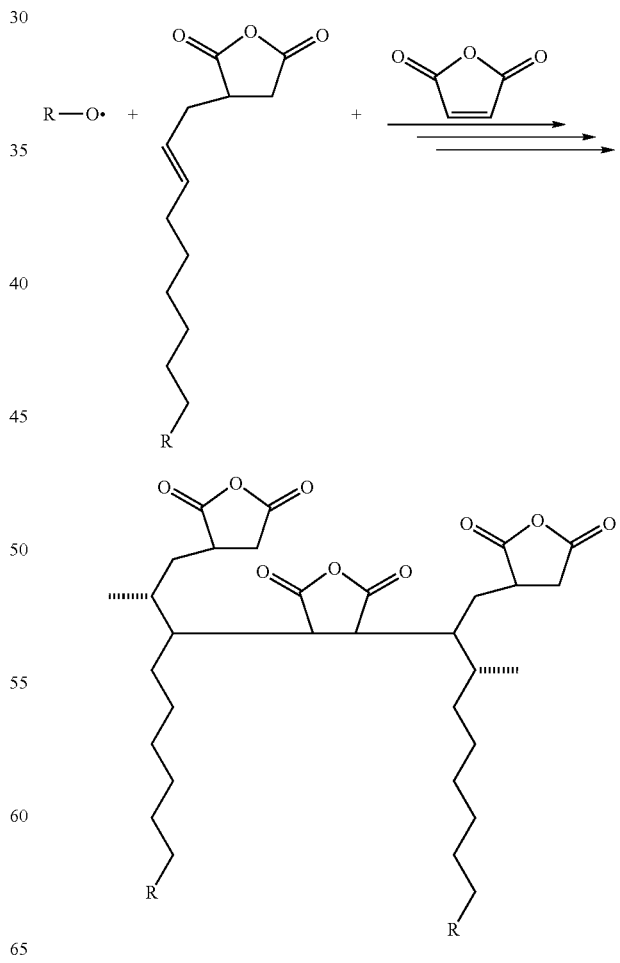

Further details may be seen in comparative Examples 15 and 16 of Table I below.

A number of potential uses are envisioned for these types of materials, including, but not necessarily limited to the applications noted below.

These products can be used as wax additives, compatibilizers, release agents, dispersing agents, and adhesion promoters in many ink and coating applications. They may provide multifunctional benefits including better scratch resistance, rub resistance, slip, pigment dispersibility, better compatibility between polar and non-polar components (e.g. in resins, pigments, wax, and fillers and the like), adhesion improvement onto a variety of substrates and hydrophobic weather resistance, and similar applications.

The inventive products may also be used in ink and coating applications in water-based, solvent-based, high solids, powder coating, hot melt coatings, radiation curing and electrocoat deposition systems. "Solvent-based" applications are non-aqueous. Coating applications include OEM coatings (e.g. automotive, marine, wood, plastic, coil, packaging, overprint, magnet wire, insulating varnish and the like), architectural paints (e.g. interior, exterior, roof, deck, and the like), and specialty coatings (e.g. automotive refinishing and the like). Inks applications include, but are not necessarily limited to, letterpress lithographic/offset, flexography, gravure, specialty inks, textile printing pastes and digital Inks.

In another non-limiting embodiment, the inventive products can be used in toners (e.g. liquid toners, dry toners or Chemical Prepared Toner, CPT, and the like), thermal transfer Inks, and ink jet inks.

In candles, non-restrictive uses for these products may be as additives to improve pigment dispersion and to aid in the color development for pigments and dyes.

These products may also be used as intermediates to make poly-quats and esters. The inventive materials may additionally be used as additives in hair styling products to improve water resistance of resins for curl resistance and anti-frizz. They may also be used as water/wear resistant polymers (for color cosmetics, and sunscreens and as conditioners for aqueous personal care products such as body wash, lotion and skin care.

In plastic films, the inventive materials may be used as tie layers to promote adhesion or as barrier layers in multi-layer structures, in other non-limiting embodiments.

These products may also find utility as compatibilizers and coupling agents in reinforced polymer systems containing inert fillers (e.g. fiberglass, talc, nanoclays, calcium carbonate, and the like) to promote polymer/filler adhesion and promote filler dispersion. These products may be used as compatibilizers to compatibilize polar and non-polar polymer blends. The inventive materials may further be used as pigment dispersants for pigmented polymers.

These products may additionally be used as sizing for fiberglass.

Also, the inventive polymers may be used as mold release agents (or components of mold release agents) and as antiblocking agents in the production of plastic articles.

The inventive products may additionally be used as impact modifiers for nylon or as lubricants for fibers.

Further, the novel polymers may be used as surfactants, adhesion promoters for adhesives, pour point depressants and chelating agents and the like.

Additionally, the inventive materials may be used in polishes (e.g. floor, furniture and automotive polishes) and in leather treatment and the like.

The expected applications for the inventive polymers herein may be additionally summarized in Table I.

TABLE I

Applications for Polypropylene with High Maleic Anhydride Content

| Market Segment | Application |
|---|---|
| Candles | Color development agents for pigments and dyes |
| | Pigment dispersants |
| Plastics | Tie layers for multi-layer co-extruded films |
| | Barrier layers for films |
| | Thermoset crosslinkers/thermoset plasticizers |
| | Coupling agents for inert fillers (glass, $CaCo_3$, etc.) |
| | Compatibilizers |
| | Impact modifiers for nylon/internal lubricants |
| | Lubricants for Kevlar fibers |
| | Nanocomposite additives |
| | Reactive monomers in polymer resins |
| | External mold release agents |
| | Internal mold release agents |
| | Antiblocking agents to promote the free flow of powders |
| | Processing aids for polymers to promote void-, gel- and defect-free production of plastic articles |
| Personal care | Intermediates for poly-quats, esters |
| | Hair styling additives to improve water resistance of resins for curl resistance and antifrizz |
| | Water/wear resistant polymers |
| | Conditioners for aqueous personal care (body wash, lotion, skin care) |
| Other | Surfactants |
| | Adhesive promoters for adhesives |
| | Floor/furniture/automotive polish modifiers |
| | Leather treatments |
| | Sizing agents for exotic cordage |
| | Pour point depressants for oil field applications |
| | Chelating agents for water treatment |
| | Temperature switches |
| Imaging | Emulsion aggregation additives for toners |
| | Ribbon release layers for thermal transfer inks |
| | Component in LED, optical displays |
| | E-coatings for deposition coatings |
| | Coatings - Adhesion promoters for various substrates |
| | Coatings - Deck protectants, weathering resistance (color, stain, etc.) |
| | Coating crosslinkers |
| | Dispersion aids for toners |
| | Plasticizers for coatings |
| | Toner resins having lubricant properties |
| | Powder coatings |
| | Compatibilizers |
| | Adhesion improvers for water based or solvent based paints/coatings for difficult to paint substrates such as TPOs (thermoplastic olefins) |
| Imaging | Wax additives, compatibilizers, release agents, dispersing agents, adhesion promoters in many ink and coating applications. They provide multifunctional benefits: better scratch, rub resistance, slip, pigment dispersibility, etc. Ink & Coating Applications in many systems such as water-based, solvent-based, high solids, powder coating, hot melt coatings, radiation curing and e-coat deposition systems |
| Coatings | OEM products coatings (automotive, marine, wood, plastic, coil, packaging, overprint, magnet wire, insulating varnish, etc.), Architectural paints (interior, exterior, roof, deck, etc.), Special coatings (automotive refinish, etc.). Inks: Letterpress Lithography |
| Digital Inks | Toner (Dry toner or CPT), thermal transfer inks, ink jet inks |
| Resins types | Maleic functionality can react with many resins having free hydrogen functionalities: for example alkyds, acrylics, polyesters, epoxies, polyamides, polyimides, silicones, polyurethanes, etc. They can also present good compatibility between polyolefins. |
| | Resins modifiers, crosslinkers, reactive oligomers or additives to improve resins performance. They can provide better hardness, better processability (flow modifier, better wetting), mechanical properties improvement |
| | Component in LED, optical displays |

To further illustrate the invention, the inventive method will be additionally described by way of the following non-limiting Examples, which are intended only to further show specific embodiments of the invention. The examples are not intended to limit the scope of the present invention and they should not be so interpreted. Amounts are in weight parts or weight percentages unless otherwise indicated.

EXAMPLES

Several batches of the inventive material have been made. They are listed below along with data from Eastman® E43 and Eastman® AP550 polypropylenes. All of the starting polypropylenes (abbreviated as PP-x) were propylene homopolymers except for PP-D and PP-E which were propylene-hexene copolymers. The purpose of using the copolymers is to lower the melting point while not significantly affecting the molecular weight.

General Maleic Anhydride Grafting Procedure 250 g of the ene reaction product of PP-C was placed in a reaction kettle with an agitator, an addition funnel, a temperature probe and a nitrogen inlet. Temperature was maintained at 185° C. 20 g of maleic anhydride was dissolved in 24 mL of acetone at room temperature, then 6 g of di-t-butyl peroxide was added and mixed well. The solution mixture was transferred to the addition funnel and was added dropwise to the 185° C. reaction mass over 3 hours. Reaction was tailed off for an additional 1 hour. The grafted product was obtained after removing solvent.

TABLE II

Examples 1–21 of Comparative and Inventive PP with Maleic Anhydride

| Ex. | Batch | Calculated wt % maleic (13C NMR) |
|---|---|---|
| 1 | Eastman ® AP550 | 4.2 |
| 2 | Eastman ® E-43 | 3.4 |
| 3 | PP-A ene | 7.9 |
| 4 | PP-A ene + graft #1 | 9.7 |
| 5 | PP-A ene + graft #2 | 11.8 |
| 6 | PP-A ene + graft #3 | 17.3 |
| 7 | PP-A ene + graft #4 | 18.3 |
| 8 | PP-A ene + graft #5 | 25.5 |
| 9 | PP-B ene | 3.5 |
| 10 | PP-B ene + graft #1 | 8.2 |
| 11 | PP-B ene + graft #2 | 7.2 |
| 12 | PP-C ene | 11.3 |
| 13 | PP-C ene + graft #1 | 16.1 |
| 14 | PP-C ene + graft #2 | 28.7 |
| 15 | PP-D ene | 0.9 |
| 16 | PP-D ene + graft #1 | 7.5 |
| 17 | PP-D ene + graft #2 | 45 |
| 18 | PP-E ene | 4.6 |
| 19 | PP-E ene + graft #1 | 9.8 |
| 20 | Octadecene ene | 35.3 |
| 21 | Octadecene ene + graft #1 | 51.0 |

It may be seen from Table II that the maleic anhydride content of the polypropylene products is greatly increased, up to about 45%, as seen in Example 14.

Many modifications may be made in the compositions, methods and implementations of this invention without departing from the spirit and scope thereof that are defined only in the appended claims. For example, the exact polypropylenes having maleic anhydride added thereto may be different from those exemplified here. Additionally, polypropylene having increased maleic anhydride contents (succinic anhydride moieties) other than those specifically mentioned may find utility in the methods of this invention. Further, preparatory methods using different free radical initiators and initiator techniques different from those used herein may find utility and benefit.

What is claimed is:

1. A composition of matter comprising homopolymers of propylene or copolymers of propylene with hexene, octene and/or other like alpha-olefins, the homopolymers or copolymers having a single unsaturation, a terminal succinic anhydride moiety, and additional succinic anhydride substitutions on the polypropylene backbone, where the succinic anhydride substitution ranges from about 5 to about 45 wt % of the total product.

2. The composition of claim 1 where the homopolymers or copolymers of propylene are prepared using a metallocene catalyst.

3. The composition of claim 2 where the homopolymers or copolymers of propylene are prepared using a metallocene catalyst in the absence of added hydrogen and other transfer agents.

4. A composition of matter comprising homopolymers of propylene or copolymers of propylene with hexene, octene and/or other like alpha-olefins, the homopolymers or copolymers having a single unsaturation, a terminal succinic anhydride moiety, and additional succinic anhydride substitutions on the polypropylene backbone, where the succinic anhydride substitution ranges from about 5 to about 45 wt % of the total product, and where the Mn molecular weight of the starting polypropylene backbone ranges from about 500 to about 150,000 daltons.

5. The composition of claim 4 where the homopolymers or copolymers of propylene are prepared using a metallocene catalyst.

6. The composition of claim 5 where the polypropylene homopolymers or copolymers of propylene are using a metallocene catalyst in the absence of added hydrogen and other transfer agents.

7. A process for making homopolymers of propylene or copolymers of propylene with hexene, octene and/or other like alpha-olefins, the homopolymers or copolymers substituted with maleic anhydride comprising:

a) reacting homopolymers or copolymers of propylene having a terminal unsaturation with maleic anhydride in a mole ratio of about 1:1 to give homopolymers or copolymers of propylene having a terminal succinic anhydride moiety and a single unsaturation, and b) reacting the homopolymers or copolymers of propylene having a terminal succinic anhydride moiety and a single unsaturation with additional maleic anhydride in the presence of free radical initiation.

where the succinic anhydride substitution ranges from about 5 to about 45 wt % of the total product.

8. The process of claim 7 where the homopolymers or copolymers of propylene in a) are prepared using a metallocene catalyst.

9. The process of claim 7 where in a) there is an absence of added hydrogen or other transfer agents.

10. The process of claim 7 where in b) the free radical initiation is selected from the group consisting of peroxides and UV radiation.

11. A process for making homopolymers of propylene or copolymers of propylene with hexene, octene and/or other like alpha-olefins, the homopolymers or copolymers substituted with maleic anhydride comprising:

a) reacting homopolymers or copolymers of propylene having a terminal unsaturation with maleic anhydride in a mole ratio of about 1:1 to give homopolymers or copolymers of propylene having a terminal succinic anhydride moiety and a single unsaturation, and b) reacting the homopolymers or copolymers of propylene having a terminal succinic anhydride moiety and a single unsaturation with additional maleic anhydride in the presence of free radical initiation to give homopolymers or copolymers of propylene substituted with maleic anhydride where succinic anhydride substitution ranges from about 5 to about 45 wt % of the total product, and where the Mn molecular weight of the starting homopolymers or copolymers of propylene backbone substituted with maleic anhydride ranges from about 500 to about 150,000 daltons.

12. The process of claim 11 where the homopolymers or copolymers of propylene in a) are prepared using a metallocene catalyst.

13. The process of claim 11 where in a) there is an absence of added hydrogen and other transfer agents.

14. The process of claim 11 where in b) the free radical initiation is selected from the group consisting of peroxides and UV radiation.

* * * * *